(12) United States Patent
Kuo (10) Patent No.: US 8,366,931 B2
(45) Date of Patent: Feb. 5, 2013

(54) FILTERING UNIT

(75) Inventor: Chi-Chang Kuo, Taichung (TW)

(73) Assignee: New Century Membrane Technology Co., Ltd., Taichung City (TW)

( * ) Notice: Subject to any disclaimer, the term of this patent is extended or adjusted under 35 U.S.C. 154(b) by 351 days.

(21) Appl. No.: 12/818,073

(22) Filed: Jun. 17, 2010

(65) Prior Publication Data

US 2011/0309010 A1 Dec. 22, 2011

(51) Int. Cl.
*B01D 33/15* (2006.01)
*B01D 63/08* (2006.01)
*B01D 63/16* (2006.01)

(52) U.S. Cl. ............. 210/331; 210/321.68; 210/321.84; 210/324; 210/330; 210/359; 210/483; 210/232

(58) Field of Classification Search .................. 210/232, 210/321.63, 323.1, 324, 330, 354, 359, 369, 210/374, 416.1, 321.75, 321.84, 321.67, 210/321.68, 331, 456, 459, 460, 483, 401–415
See application file for complete search history.

(56) References Cited

U.S. PATENT DOCUMENTS

| | | | | |
|---|---|---|---|---|
| 3,157,598 A * | 11/1964 | Rebiscoul | ...................... | 210/327 |
| 3,259,248 A * | 7/1966 | Wiegand | ........................ | 210/487 |
| 3,648,844 A * | 3/1972 | Krynski et al. | ................ | 210/487 |
| 3,884,805 A * | 5/1975 | Bagdasarian et al. | ........ | 210/791 |
| 4,025,425 A * | 5/1977 | Croopnick et al. | ........... | 210/637 |
| 4,132,649 A * | 1/1979 | Croopnick et al. | ........... | 210/347 |
| 5,536,405 A * | 7/1996 | Myrna et al. | ............. | 210/321.75 |
| 7,267,236 B2 * | 9/2007 | Kuo | .............................. | 210/415 |
| 7,396,462 B2 * | 7/2008 | Kuo | ......................... | 210/321.63 |
| 8,177,073 B2 * | 5/2012 | Kuo | .............................. | 210/415 |
| 2009/0114587 A1* | 5/2009 | Kuo | .............................. | 210/346 |
| 2009/0127178 A1* | 5/2009 | Kuo | .............................. | 210/232 |
| 2009/0134086 A1* | 5/2009 | Kuo | ......................... | 210/321.68 |
| 2011/0036767 A1* | 2/2011 | Kuo | ......................... | 210/321.69 |

* cited by examiner

*Primary Examiner* — Tony G Soohoo
*Assistant Examiner* — David C Mellon (57) ABSTRACT

A filtering unit includes alternately arranged membranes and positioning rings. A seal is secured to each of the positioning rings. Each of the positioning rings includes an annular body, arched cutouts defined in an internal edge of the annular body, first and second engaging members formed on the annular body, and at least one slot defined in the annular body. Each of the first engaging members is located near an end of a related one of the arched cutouts. Each of the second engaging members is located near another end of a related one of the arched cutouts. The second engaging members can be engaged with the first engaging members of another positioning ring extending through the arched cutouts. Each of the seals includes two sealing portions extending on two opposite faces of the annular body and at least one connecting portion extending between the sealing portions through the slot.

8 Claims, 7 Drawing Sheets

FIG. 7

FILTERING UNIT

BACKGROUND OF INVENTION

1. Field of Invention

The present invention relates to a filtering unit.

2. Related Prior Art

As disclosed in U.S. Pat. No. 7,396,462, a filtering unit 100 includes a fluid-collecting tube 7 inserted through alternately arranged positioning rings 2 (2') and membranes 5. The fluid-collecting tube 7 defines a fluid channel 70 and apertures 71 in communication of fluid with the fluid channel 70.

Each of the positioning rings 2 (2') includes an annular body 21 (21') sleeved around the fluid-collecting tube and formed with annularly displaced arched cutouts 23 (23') around the fluid-collecting tube. Each of the arched cutouts 23 (23') includes opposite first and second ends 231 and 232 (231' and 232'). The annular body 21 (21') of each of the positioning rings 2 (2') includes a plurality of first engaging members 24 (24') and a plurality of second engaging members 25 (25'). Each of the first engaging members 24 (24') is located adjacent to the first end 231 (231') of a respective one of the arched cutouts 23 (23'). Each of the second engaging members 25 (25') is located adjacent to the second end 232 (232') of a respective one of the arched cutouts 23 (23').

The rings 21, 21' of each adjacent pair of the positioning rings 2, 2' are coupled to each other and are rotatable relative to each other between a first relative position and a second relative position offset from the first relative position.

The first engaging members 24 of the ring 21 of each adjacent pair of the positioning rings 10, 10' are disengaged from the second engaging members 25' of the ring 21' of each adjacent pair of the positioning rings 10, 10' when the rings 11, 11' of each adjacent pair of the positioning rings 10, 10' are located in the first relative position. The first engaging members 24 of the ring 21 of each adjacent pair of the positioning rings 10, 10' are engaged with the second engaging members 25' of the ring 21' of each adjacent pair of the positioning rings 10, 10' when the rings 11, 11' of each adjacent pair of the positioning rings 10, 10' are located in the second relative position.

The annular body 11 (11') of each of the positioning rings 10 (10') includes upper and lower surfaces 211 and 212 (211' and 212'), and is further formed with upper and lower annular recesses 28 (28') indented inwardly and respectively from the upper and lower surfaces 211 and 212 (211' and 212'). Upper and lower seals 3 are respectively located in the upper and lower annular recesses 28 (28') in the annular body 11 (11') of each of the positioning rings 10 (10') and are respectively in sealing contact with an adjacent pair of the membranes 5.

The seals 3 provide good sealing between the positioning rings 10 (10') and the membranes 5. However, each of the seals 3 is subject to a friction-based torque from a related one of the positioning rings 10 (10') and is subject to an opposite friction-based torque from a related one of the membranes 5 when the positioning ring 2 (2') is spun relative to the membrane 5 during the assembly. The difference between the values of the friction-based torques spins the seal 3 and would sometimes remove the seal 3 from the annular recess 28 (28').

The present invention is therefore intended to obviate or at least alleviate the problems encountered in prior art.

SUMMARY OF INVENTION

It is the primary objective of the present invention to provide a reliable filtering unit.

To achieve the foregoing objective, the filtering unit includes alternately arranged membranes and positioning rings. A seal is secured to each of the positioning rings. Each of the positioning rings includes an annular body, arched cutouts defined in an internal edge of the annular body, first and second engaging members formed on the annular body, and at least one slot defined in the annular body. Each of the first engaging members is located near an end of a related one of the arched cutouts. Each of the second engaging members is located near another end of a related one of the arched cutouts. The second engaging members can be engaged with the first engaging members of another positioning ring extending through the arched cutouts. Each of the seals includes two sealing portions extending on two opposite faces of the annular body and at least one connecting portion extending between the sealing portions through the slot.

Other objectives, advantages and features of the present invention will become apparent from the following description referring to the attached drawings.

BRIEF DESCRIPTION OF DRAWINGS

The present invention will be described via detailed illustration of the preferred embodiment referring to the drawings where.

DETAILED DESCRIPTION OF PREFERRED EMBODIMENT

A filtering device includes a filtering unit located in a column with an inlet and outlet defined therein. Several tubes are located in the column for cleaning purposes.

Figure 5:
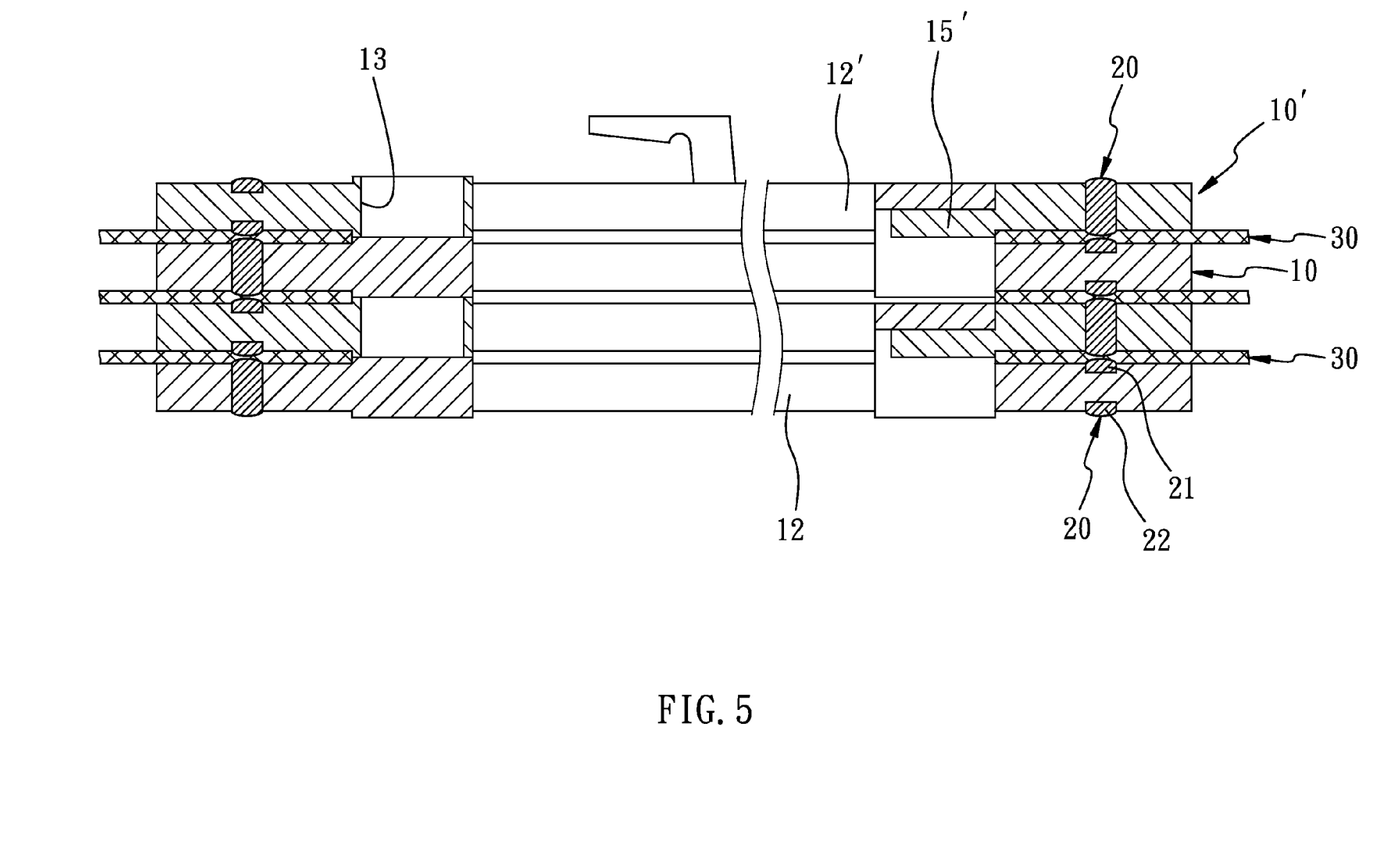
FIG. 5 is a cross-sectional view of the filtering unit shown in FIG. 1.

Referring to FIG. 5, a filtering unit includes a plurality of membranes 30, a plurality of positioning rings 10 and a plurality of seals 20 according to the preferred embodiment of the present invention. All of the membranes 30, positioning rings 10 and seals 20 are located around a fluid-collecting tube as disclosed in U.S. Pat. No. 7,396,462. The membranes 30 and the positioning rings 10 are arranged alternately, i.e., each of the membranes 30 is located between two adjacent ones of the positioning rings 10. Hence, the number of the positioning rings 10 is larger than that of the membranes 30 by one (1). The membranes 30 and the positioning rings 10 are located around the fluid-collecting tube. Each of the seals 20 is secured to a related one of the positioning rings 10. Each of the seals 20 seals a gap between the related positioning ring 10 and one of the membranes 30 on one hand, and seals a gap between the related positioning ring 10 and another one of the membranes 30.

Figure 1:
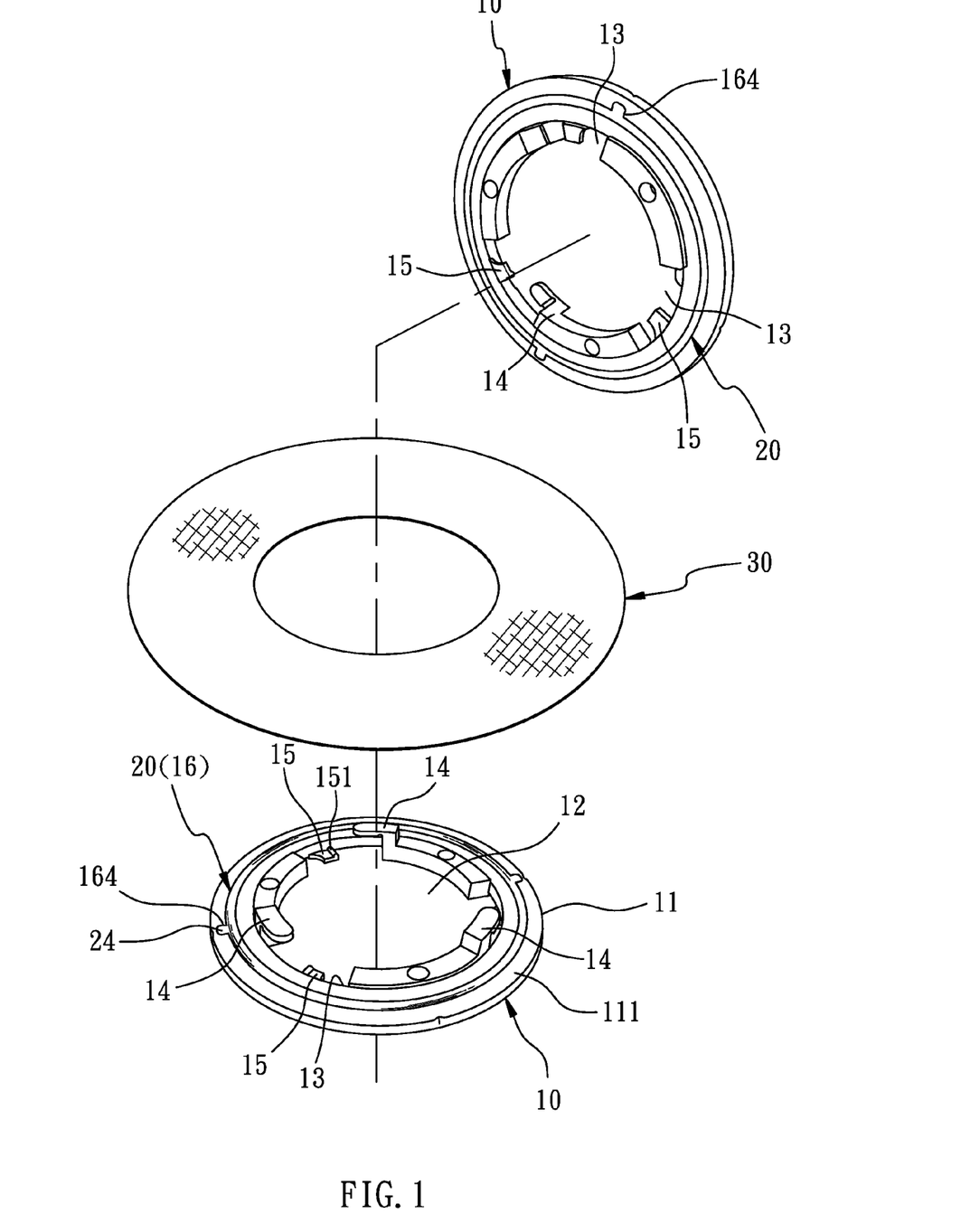
FIG. 1 is a partial, exploded view of a filtering unit including alternatively arranged membranes and positioning rings according to the preferred embodiment of the present invention.
Figure 2:
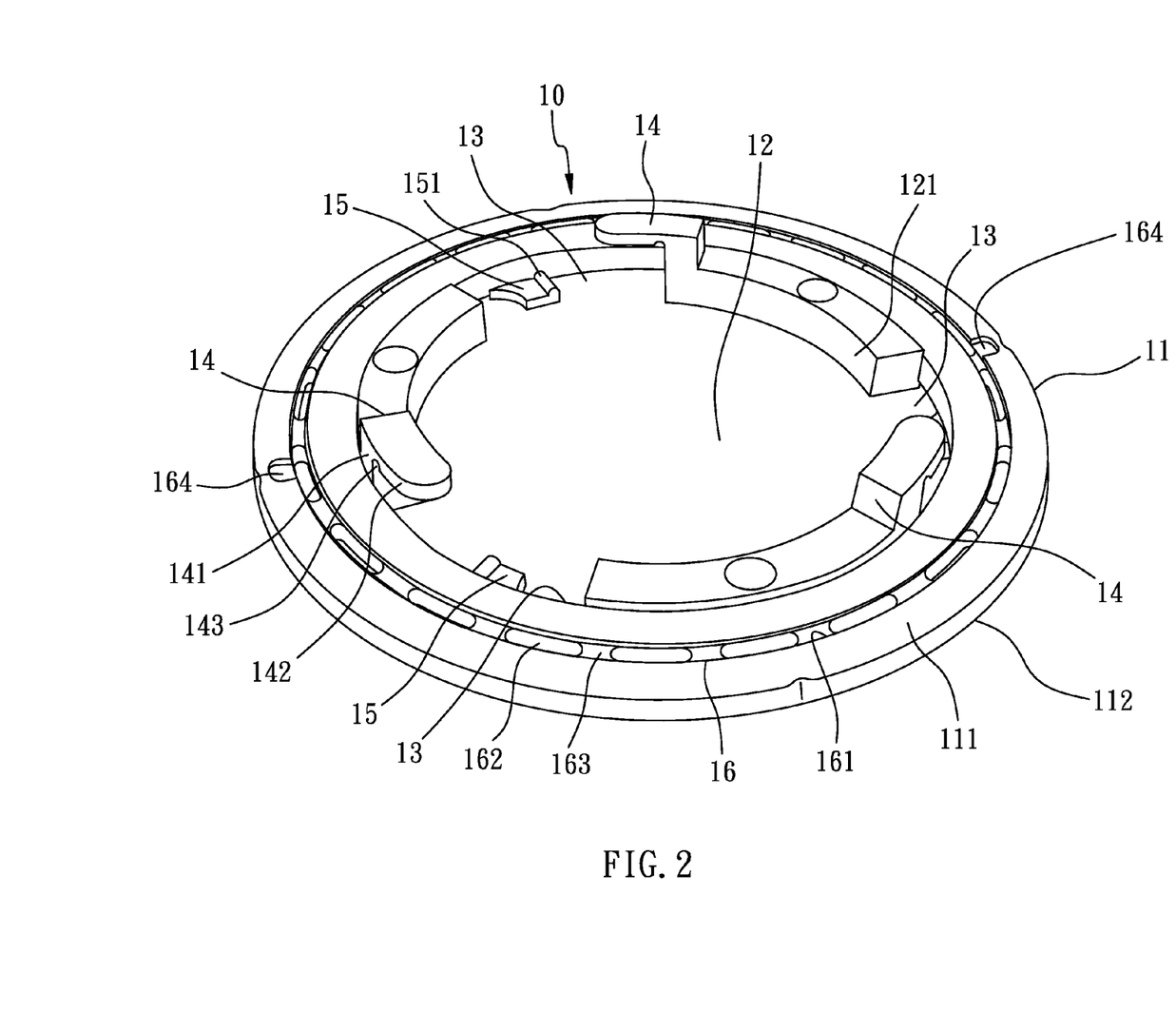
FIG. 2 is a perspective view of one of the positioning rings of the filtering unit shown in FIG. 1.

Referring to FIGS. 1 and 2, each of the positioning rings 10 includes an annular body 11. The annular body 11 includes an aperture 12 axially defined therein. The aperture 12 is defined by an internal edge 121 of the annular body 11. A plurality of arched cutouts 13 is defined in the internal edge 121 of the annular body 11 and in communication of fluid with the aperture 12. Each of the arched cutouts 13 includes opposite first and second ends.

Figure 6:
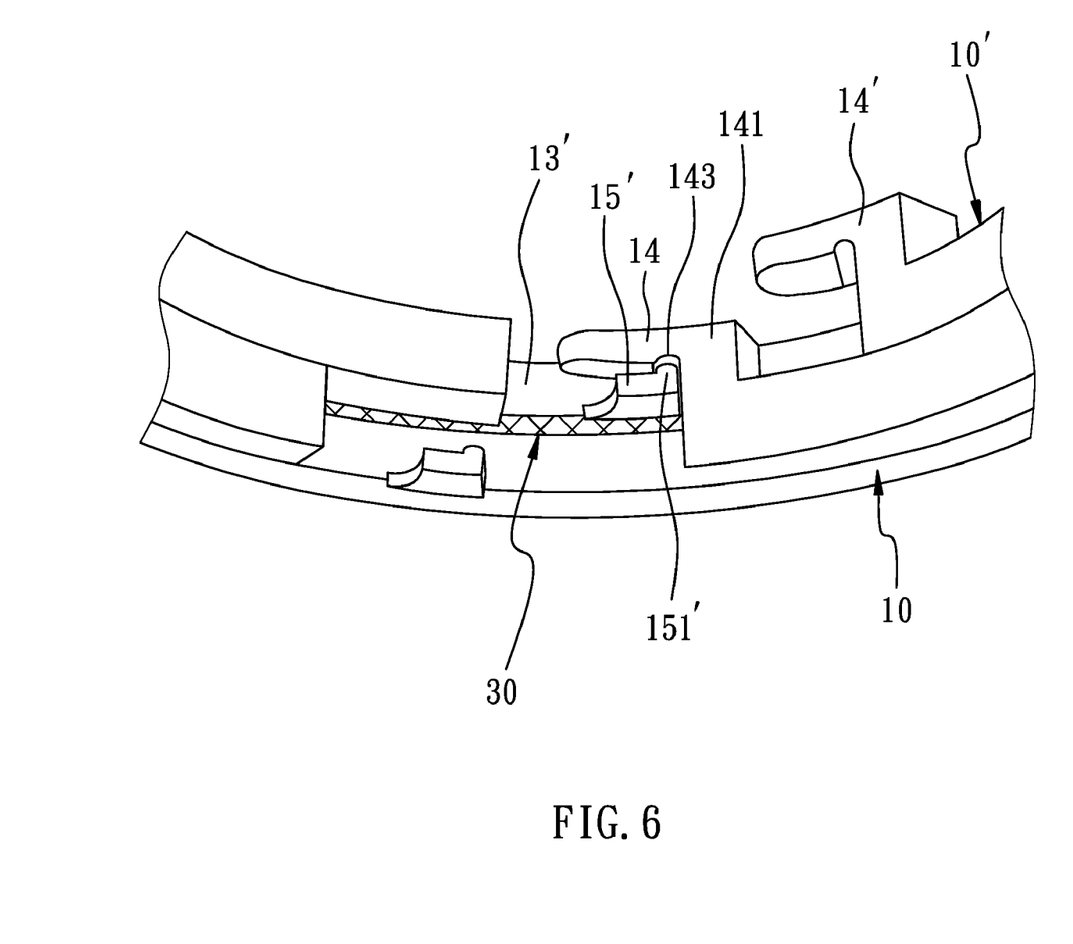
FIG. 6 is a partial, perspective view of one of the positioning rings shown in FIG. 1.

Further referring to FIG. 6, a plurality of first engaging members 14 is formed on the annular body 11. Each of the first engaging members 14 is located adjacent to the first end of a related one of the arched cutouts 13. Each of the first engaging members 14 includes a vertical section 141 extending from an upper face 111 of the annular body 11 and a horizontal section 142 extending from the vertical section 141. The vertical section 141 is in perpendicular to an upper face of the annular body 11 while the horizontal section 142 is in parallel to the upper face of the annular body 11. Each of the first engaging members 14 includes a slit 143 defined in an intermediate portion between the vertical section 141 and the horizontal section 142. The slit 143 can be defined in any proper position of the horizontal section 142 in another embodiment.

A plurality of second engaging members 15 is formed on the annular body 11. Each of the second engaging members 15 is located adjacent to the second end of a related one of the arched cutouts 13. Each of the second engaging members 15 includes a rib 151 formed thereon. The rib 151 is made corresponding to the slit 143.

Each of the positioning rings 10 includes a seal-retaining device 16. The seal-retaining device 16 includes an annular groove 161 defined in the upper face 111 of the annular body 11, another annular groove 161 defined in a lower face of the annular body 11 and arched slots 162 each in communication with both of the annular grooves 161. A spoke 163 is formed between every two adjacent ones of the arched slots 162. A plurality of recesses 164 is defined in an external or internal annular wall of each of the annular grooves 161.

The seals 20 are made of a self-lubricating material such as thermoplastic rubber, thermoplastic vulcanizate and thermoplastic elastomer. As made of the self-lubricating material, friction between the seals 20 and the membranes 30 is low. Each of the seals 20 are formed on and hence secured to a related one of the positioning rings 10 by injection of the self-lubricating material.

Figure 7:
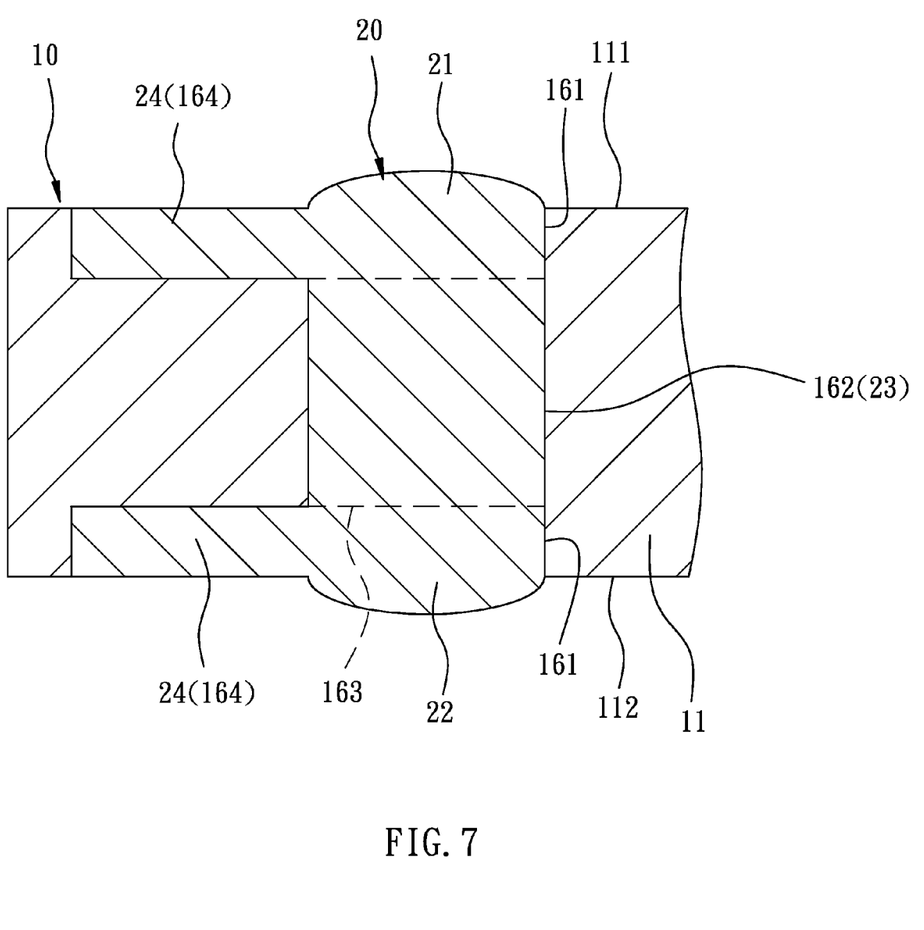
FIG. 7 is a partial, cross-sectional view of the positioning ring shown in FIG. 6.

Further referring to FIG. 7, each of the seals 20 includes two annular sealing portions 21 and 22, a plurality of connecting portions 23 and a plurality of bosses 24. The sealing portion 21 is located in the annular groove 161 defined in the upper side of the annular body 11. The sealing portion 22 is located in the annular groove 161 defined in the lower side of the annular body 11. The connecting portions 23 connect the sealing portion 21 to the sealing portion 22. Each of the connecting portions 23 extends through a related one of the arched slots 162 defined in the annular body 11. Each of the seals 20 wraps the spokes 163 of the related positioning ring 10. Therefore, each of the seals 20 is secured to the related positioning ring 10, i.e., rotation of the former relative to the latter is prevented, and escaping of the former from the latter is also avoided. Each of the bosses 24 is located in a related one of the recesses 164 to further prevent rotation of each of the seals 20 on the related positioning ring 10 and avoid escaping of each of the seals 20 from the related positioning ring 10.

As clearly shown in FIG. 5, each of the membranes 30 is located between two adjacent ones of the positioning rings 10. Each of the positioning rings 10 is rotatable relative to an adjacent one of the positioning rings 10 between a first relative position and a second relative position offset from the first relative position. In the first relative position, the two adjacent positioning rings 10 are disconnected from each other. In the second relative position, the two adjacent positioning rings 10 are connected to each other, and the related membrane 30 is retained between them.

For clarity, the following description of how the membranes 30 and the positioning rings 10 are assembled will be focused on only one of the membranes 30 provided between two adjacent ones of the positioning rings 10. It is to be understood that the membranes 30 are identical to one another and that the positioning rings 10 are identical to one another. Moreover, one of the adjacent positioning rings 10 is renumbered 10'. However, it is to be understood that all of the features of the positioning ring 10' are identical to that of the positioning ring 10 except additionally marked with a prime in the following description.

Figure 3:
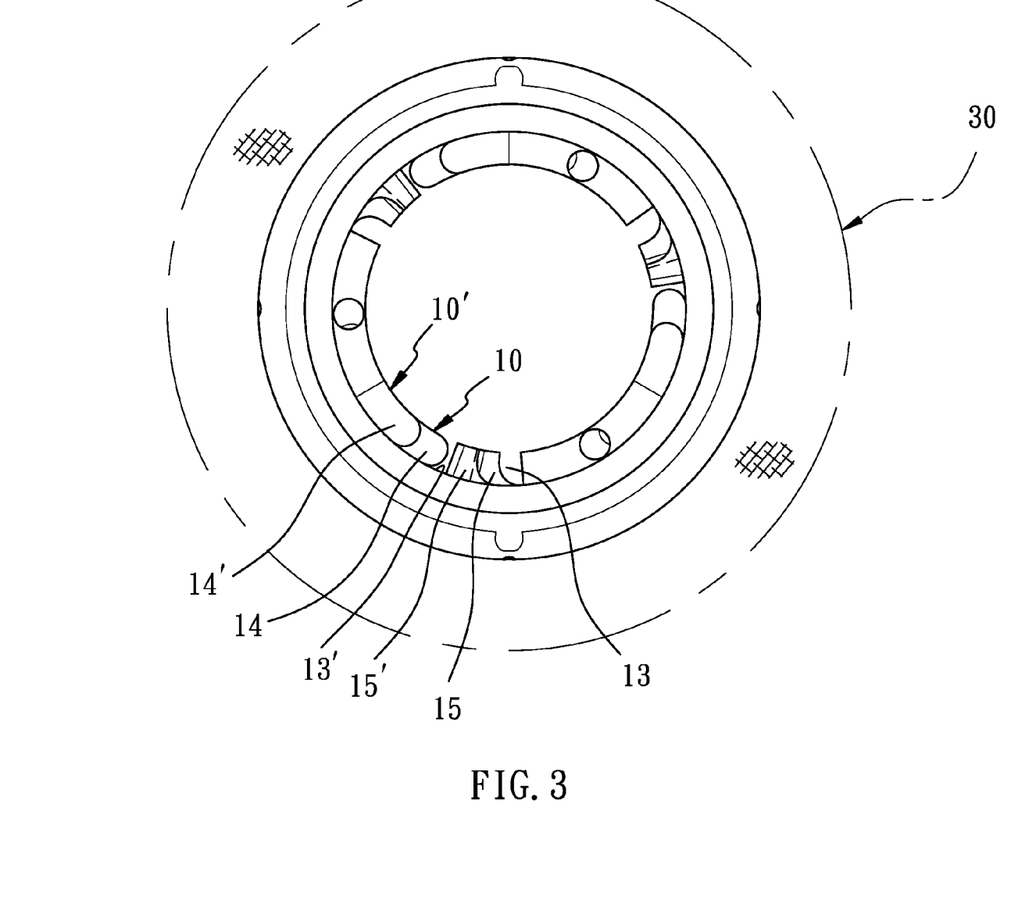
FIG. 3 is a top view of two adjacent ones of the positioning rings shown in FIG. 1.

Referring to FIG. 3, the first engaging members 14 of the positioning ring 10 are inserted through the arched cutouts 13' of the positioning ring 10'. The positioning rings 10 and 10' are in the first relative position where the first engaging members 14 of the positioning ring 10 are disengaged from the second engaging member 15' of the positioning ring 10'. In particular, the slits 143 of the first engaging members 14 of the positioning ring 10 do not receive the ribs 151' of the second engaging members 15' of the positioning ring 10'. Therefore, the positioning ring 10 is disconnected from the positioning ring 10'.

Figure 4:
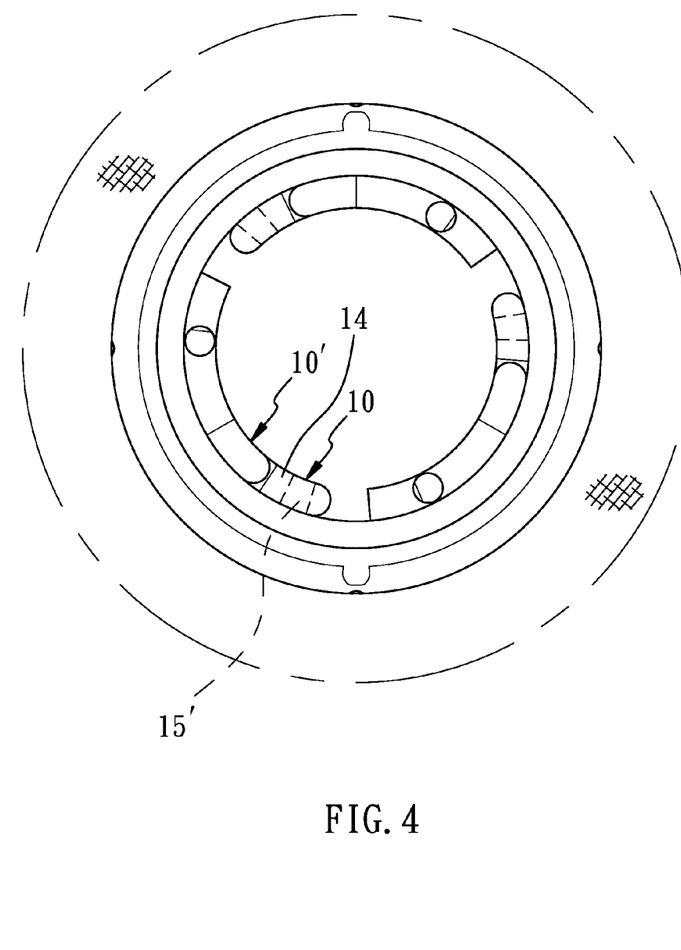
FIG. 4 is another top view of the positioning rings shown in FIG. 3, joined together.

Referring to FIGS. 4 and 5, the positioning rings 10 and 10' are in the second relative position where the first engaging members 14 of the positioning ring 10 are engaged with the second engaging members 15' of the positioning ring 10'. In particular, the slits 143 of the first engaging members 14 of the positioning ring 10 receive the ribs 151' of the second engaging members 15' of the positioning ring 10'. Hence, the positioning ring 10 is connected to the positioning ring 10'.

Referring to FIGS. 5 and 7, the sealing portion 22 of the seal 20 seals a gap between the related positioning ring 10' and the membrane 30 while the sealing portion 21 of the seal 20 seals a gap between the related positioning ring 10 and the membrane 30. That is, each of the seals 20 seals a gap between the related positioning rings 10 and one of the membranes 30 on one hand, and seals a gap between the related positioning rings 10 and another one of the membranes 30.

Advantageously, each of the seals 20 is secured to a related one of the positioning rings 10. The filtering unit of the present invention exhibits at least two advantages from this feature. Firstly, it is reliable since the seals 20 are secured to the positioning rings 10, and the proper positions and functioning of the seals 20 are ensured. Secondly, the production of the filtering unit is fast since the positioning rings 10, the seals 20 and the membranes 30 can be assembled fast without having to worry about the seals 20 being deformed or dropped from the positioning ring 10.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:
1. A filtering unit comprising:
    membranes;
    positioning rings alternately arranged with the membranes, wherein each of the positioning rings includes:
        an annular body;
        arched cutouts defined in an internal edge of the annular body;

first engaging members formed on the annular body, wherein each of the first engaging members is located near an end of a corresponding one of the arched cutouts;

second engaging members formed on the annular body, wherein each of the second engaging members is located near another end of a corresponding one of the arched cutouts, wherein the second engaging members can be engaged with the first engaging members of another positioning ring extending through the arched cutouts; and at least one slot defined in the annular body; and seals, each including:

two sealing portions extending on two opposite faces of the annular body; and at least one connecting portion extending to one of the sealing portions from the other sealing portion through the slot.

2. The filtering unit according to claim 1, wherein each of the positioning rings includes two grooves in communication with the at least one slot, wherein the grooves receive the sealing portions.

3. The filtering unit according to claim 2, wherein the at least one slot includes a plurality of slots so that a spoke is formed between any two adjacent ones of the slots, wherein the seals wrap the spokes.

4. The filtering unit according to claim 2, wherein each of the seals includes at least one boss formed thereon, wherein each of the positioning rings includes at least one recess defined in a wall of each of the grooves for receiving the at least one boss of a corresponding one of the seals.

5. The filtering unit according to claim 1, wherein the seals are made of a self-lubricating material.

6. The filtering unit according to claim 5, wherein the self-lubricating material is selected from a group consisting of thermoplastic rubber, thermoplastic vulcanizate and thermoplastic elastomer.

7. The filtering unit according to claim 1, wherein each of the first engaging members includes a vertical section in perpendicular to the face of the annular body and a horizontal section in parallel to the face of the annular body for engagement with a corresponding one of the second engaging members of another positioning ring.

8. The filtering unit according to claim 7, wherein each of the first engaging members includes a slit defined in the horizontal section, wherein each of the second engaging members includes a rib that can be inserted in the slit defined in the horizontal section of a corresponding one of the first engaging members of another positioning ring.

* * * * *